US012709550B2

(12) United States Patent
Tavernier et al.

(10) Patent No.: US 12,709,550 B2
(45) Date of Patent: Aug. 18, 2026

(54) VANADIUM OXIDE EXTRACTION FROM BAYER PROCESS

(71) Applicant: SNF GROUP, Andrézieux-Bouthéon (FR)

(72) Inventors: Bruno Tavernier, Andrézieux-bouthéon (FR); M. Venkata Jagannath, Visakhapatnam (IN); Aurélien Bonneau, Andrézieux-bouthéon (FR); Manish Kumar Mishra, Visakhapatnam (IN)

(73) Assignee: SNF GROUP, Andrézieux-Bouthéon (FR)

(*) Notice: Subject to any disclaimer, the term of this patent is extended or adjusted under 35 U.S.C. 154(b) by 41 days.

(21) Appl. No.: 18/881,477

(22) PCT Filed: Aug. 2, 2024

(86) PCT No.: PCT/EP2024/071970
§ 371 (c)(1),
(2) Date: Jan. 6, 2025

(87) PCT Pub. No.: WO2025/031971
PCT Pub. Date: Feb. 13, 2025

(65) Prior Publication Data

US 2025/0171328 A1 May 29, 2025

(30) Foreign Application Priority Data

Aug. 4, 2023 (IN) ............................ 202311052659

(51) Int. Cl.
*C01G 31/02* (2006.01)
*B01D 9/00* (2006.01)

(52) U.S. Cl.
CPC ........... *C01G 31/02* (2013.01); *B01D 9/0031* (2013.01); *B01D 9/005* (2013.01)

(58) Field of Classification Search
CPC ...... C01G 31/02; B01D 9/0031; B01D 9/005; C22B 3/205; C22B 3/41; C22B 34/22
See application file for complete search history.

(56) References Cited

U.S. PATENT DOCUMENTS 4,578,255 A * 3/1986 Roe .......................... C01F 7/47 423/121

FOREIGN PATENT DOCUMENTS

| | | | |
|---|---|---|---|
| AU | 755418 | B2 | 12/2002 |
| CN | 1887724 | A | 1/2007 |
| CN | 1887725 | A | 1/2007 |
| CN | 101117238 | B | 7/2010 |
| CN | 103159259 | B | 6/2017 |
| CN | 108085517 | A | 5/2018 |
| CN | 115948653 | A | 4/2023 |

OTHER PUBLICATIONS

International Search Report issued on Nov. 15, 2024, in corresponding International Application No. PCT/EP2024/071970, 4 pages.
Zhao Zhuo et al: "Recovery of V2O5 from Bayer liquor by ion exchange", Rare Metals, Xiyou Jinshu, vol. 29, No. 2, Mar. 28, 2010 (Mar. 28, 2010), pp. 115-120, 6 pages.
Written Opinion issued on Nov. 15, 2024, in corresponding International Application No. PCT/EP2024/071970, 11 pages.

* cited by examiner

*Primary Examiner* — Wayne A Langel
*Assistant Examiner* — Syed T Iqbal
(74) *Attorney, Agent, or Firm* — Maier & Maier, PLLC

(57) ABSTRACT

A process for increasing the extraction yield of vanadium oxides from the spent liquor generated in the Bayer process for the recovery of alumina from bauxite, with the use of a water-soluble polymer. The water-soluble may be a polysaccharide or a synthetic polymer, which may include at least one non-ionic and/or anionic and/or cationic hydrophilic monomers.

10 Claims, No Drawings

VANADIUM OXIDE EXTRACTION FROM BAYER PROCESS

FIELD

The present invention concerns a process for increasing the extraction yield of vanadium oxides from the spent liquor generated in the Bayer process for the recovery of alumina from bauxite.

BACKGROUND

The Bayer process is almost universally used to produce alumina from bauxite ore. The process involves pulverizing a bauxite ore, slurring it in caustic soda solution and digesting it at elevated temperatures and pressures. The caustic soda solution dissolves oxides of aluminum to form an aqueous sodium aluminate solution. The caustic-insoluble constituents of bauxite ore (referred to as "red mud") are then separated from the aqueous phase containing the dissolved sodium aluminate. This separation typically occurs through sedimentation, which is often aided by a flocculant, and filtration. Once separated, alumina trihydrate is precipitated from the aqueous sodium hydroxide and collected as product.

During this precipitation, the clarified sodium aluminate liquor is cooled and seeded with alumina trihydrate crystals to induce precipitation of alumina in the form of alumina trihydrate, $Al(OH)_3$. The alumina trihydrate particles or crystals are then classified by particle size and separated from the concentrated caustic liquor. A flocculant is used to aid in this classification and separation process. The very fine particles of alumina trihydrate are returned as the seed crystals and the coarser particles are collected as product. The remaining liquid phase, referred to as "spent liquor" can be evaporated through a series of heat exchangers and subsequently cooled in a series of flash tanks. The condensate formed in the heaters is re-used in the process, for instance as boiler feed water or for washing bauxite residue. The remaining caustic soda is washed and recycled back into the digestion process. In some case, the remaining caustic soda contains an amount of vanadium oxides that make it of interest to extract.

One example of separation technique is to cool the spent liquor into a decanter. Low temperature favors the crystallization of vanadium oxides and their decantation, and thus the underflow is enriched in vanadium oxides crystals. The underflow can then be centrifuged to separate the spent liquor depleted in vanadium oxides from the solid composed of crystallized vanadium oxides.

Vanadium oxides are undesirable compounds in the Bayer process, and it is therefore undesirable for them to accumulate in the system. But, on the other hand, vanadium extracted in this way can be recovered as a metal sold in various industries (alloy manufacturing, chemical reaction catalysts).

So, there is a need to increase the yield of vanadium extraction from the spent liquor generated in the Bayer process for the recovery of alumina from bauxite.

SUMMARY

Surprisingly, The Applicant discovered that using a water-soluble polymer during decantation of the spent liquor induces an increase of the yield of vanadium extraction generated in the Bayer process for the recovery of alumina from bauxite.

Without being bound by any theory, the addition of a water-soluble polymer helps the crystallization of vanadium oxides and sedimentation in spent liquor.

More precisely, the invention deals with a process for vanadium oxides extraction from a spent liquor SL generated in a Bayer process comprising the following steps:

Sending the spent liquor SL to an evaporator, to separate condensate water from caustic soda concentrate CSC, Optionally transferring CSC to a vessel V, Cooling and maintaining the temperature of the CSC between 20° C. and 80° C., Adding a water-soluble polymer P to said CSC to obtain a suspension S comprising vanadium oxide VO particles, Recovering said vanadium oxide VO particles from the suspension S by a liquid-solid separation method.

DETAILED DESCRIPTION

According to the invention, "X and/or Y" means "X", or "Y", or "X and Y".

The invention also includes all possible combinations of the various embodiments disclosed, whether preferred or given by way of example. In addition, where ranges of values are indicated, the terminals form part of these ranges. The disclosure also includes all combinations between the bounds of these value ranges. For example, the value ranges "1-20, preferably 5-15", imply disclosure of the ranges "1-5", "1-15", "5-20" and "15-20" and the values 1, 5, 15 and 20.

By "hydrophilic monomer" is meant a monomer which has an octanol/water partition coefficient, Kow, of less than 1 or equal 1, in which the Kow partition coefficient is determined at 25° C. in an octanol/water mixture having a volume ratio of 1/1, at a pH of between 6 and 8.

By "hydrophobic monomer" is meant a monomer which exhibits an octanol/water partition coefficient, Kow, greater than 1, wherein the Kow partition coefficient is determined at 25° C. in an octanol/water mixture having a volume ratio of 1/1, at a pH of between 6 and 8.

The octanol/water partition coefficient, Kow, represents the ratio of concentrations (g/L) of a monomer between the octanol phase and the aqueous phase. It is defined as follows:

$$K_{ow} = \frac{[\text{monomer}]_{octanol}}{[\text{monomer}]_{water}}$$

In the Bayer process, spent liquor SL is the caustic soda solution obtained after precipitation and recovery of particles of alumina trihydrate.

The evaporation step of the SL, to separate condensate water from caustic soda concentrate CSC can be performed by a heat exchanger or a series of heat exchangers. Accordingly, the evaporator may be composed of a heat exchanger or a series of heat exchangers.

Typically, between 20 and 80 weight percent of water is condensed during this evaporation step. In other words, water content of CSC is decreased by 20 and 80 weight percent by comparison with water content of SL.

Optionally, the CSC coming from the exist of the evaporator is transferred into a vessel V. Said transfer can be performed by a pipeline connected at the exit of the evaporator, or the heat exchanger, or of the last heat exchanger of the series, and at the means of filling the vessel.

Optionally the CSC can be stirred in the optional vessel V. Stirring is preferentially performed by means a stirring blade.

The CSC is cooled and maintained at a temperature between 20° C. and 80° C., preferably between 20° C. and 60° C. The cooling of the CSC may be performed during the evaporation step, and/or during transfer of the CSC from exit of the evaporator and the optional vessel V, and/or in the optional vessel V. In the case there is no vessel V, the cooling of the CSC may also be performed during transfer of the CSC from the evaporator to the solid/liquid separation step, and before the addition of the water-soluble polymer P.

The temperature control of the CSC is advantageously performed by means a temperature probe introduced inside the CSC.

Preferably a heat transfer fluid circulating in the optional vessel V equipped with a double outer jacket provides cooling and temperature regulation of the CSC.

When the cooling of CSC is performed during the transfer of the CSC to vessel V the CSC may be cooled during transfer at a temperature comprised between 20° C. and 80° C., and then the temperature of the CSC is maintained between 20° C. and 80° C. in the Vessel V. It is also possible to cool the CSC during transfer at a temperature above 80° C., and to cool further the CSC in the vessel V to reach a temperature comprised between 20° C. and 80° C.

By "vanadium oxide VO" is meant Vanadium (II) oxide (vanadium monoxide) VO; Vanadium (III) oxide (vanadium sesquioxide or trioxide) V2O3; Vanadium (IV) oxide (vanadium dioxide) $VO_2$; Vanadium (V) oxide (vanadium pentoxide) $V_2O_5$; vanadium oxide of the general formula $VnO_{2n+1}$ ($V_3O_7$, $V_4O_9$ and $V_6O_{13}$); vanadium oxide of the general formula $V_nO_{2n-1}$ ($V_4O_7$, $V_5O_9$, $V_6O_{11}$, $V_7O_{13}$ and $V_8O_{15}$); or $V_3O_5$, or combination thereof.

By "vanadium oxide VO particle" is meant a particle comprising at least 5% by weight of at least one vanadium oxide. The vanadium oxide VO particle obtained according to the process of the invention preferably comprises at least 10% by weight of at least one vanadium oxide.

By "polymer" is meant a natural polymer or a chemically modified natural polymer or a synthetic homopolymer or copolymer prepared from at least two different monomers.

The expression "polymer P" is used in the following description and corresponds to the water-soluble polymer P used in the process of the invention.

By water-soluble polymer is meant a polymer which gives an aqueous solution without insoluble particles when dissolved with stirring at 25° C. and with a concentration of 10 g·L−1 in deionized water.

Water-soluble polymer P can be a natural polymer or a chemically modified natural polymer or a synthetic polymer or a semi-synthetic (or semi-natural) polymer.

When the polymer P is a natural polymer, it is preferably a polysaccharide and more preferably a dextran.

Preferably, polymer P is a synthetic polymer and more preferably a synthetic polymer comprising at least one non-ionic and/or anionic and/or cationic hydrophilic monomers chosen in the following list:

- nonionic monomers: acrylonitrile, acrylamide, methacrylamide, N-vinylformamide (NVF), N-vinylacetamide, N-vinylpyrrolidone (NVP), N-vinylimidazole, N-vinyl succinimide, acryloyl morpholine (ACMO), glycidyl methacrylate, glyceryl methacrylate, diacetone acrylamide, N-methylolacrylamide (NMA), hydroxyalkyl ($C_1$-$C_3$)-(meth)acrylate, thioalkyl ($C_1$-$C_3$)-(meth)acrylate and mixtures thereof,
- anionic monomers: acrylic acid, methacrylic acid, itaconic acid, crotonic acid, maleic acid, fumaric acid, acrylamido undecanoic acid, 3-acrylamido 3-methylbutanoic acid, maleic anhydride, 2-acrylamido-2-methylpropane sulfonic acid (ATBS), vinylsulfonic acid, vinylphosphonic acid, methallylphophonic acid, 2-sulfoethylmethacrylate, sulfopropylmethacrylate, sulfopropylacrylate, allylphosphonic acid, styrene sulfonic acid, 2-acrylamido-2-methylpropane disulfonic acid, their salts and mixtures thereof,
- cationic monomers: diallyldialkyl ammonium salts, such as diallyl dimethyl ammonium chloride (DADMAC); acidified or quaternized salts of dialkylaminoalkylacrylamides; acidified or quaternized salts of dialkyl-aminoalkylmethacrylamides, e.g. methacrylamido-propyl trimethyl ammonium chloride (MAPTAC), acrylamido-propyl trimethyl ammonium chloride (APTAC), acidified or quaternized salts of dialkylaminoalkyl acrylate, such as quaternized or salified dimethylaminoethyl acrylate (ADAME), acidified or quaternized salts of dialkylaminoalkyl methacrylate, such as quaternized or salified dimethylaminoethyl methacrylate (MADAME), and mixtures thereof. Alkyl groups are $C_1$-$C_3$.

Optionally, the polymer P comprises at least one zwitterionic hydrophilic monomer chosen in the following list: dimethylaminoethyl acrylate derivatives, such as 2-((2-(acryloyloxy)ethyl) dimethylammonio) ethane-1-sulfonate, 3-((2-(acryloyloxy)ethyl) dimethylammonio) propane-1-sulfonate, 4-((2-(acryloyloxy)ethyl) dimethylammonio) butane-1-sulfonate, [2-(acryloyloxy)ethyl](dimethylammonio) acetate, dimethylaminoethyl methacrylate derivatives such as 2-((2-(methacryloyloxy)ethyl)dimethylammonio)ethane-1-sulfonate, 3-((2-(methacryloyloxy) ethyl) dimethylammonio) propane-1-sulfonate, 4-((2-(methacryloyloxy) ethyl) dimethylammonio) butane-1-sulfonate, [2-(methacryloyloxy)ethyl](dimethylammonio) acetate, dimethylamino propylacrylamide derivatives such as 2-((3-acrylamidopropyl) dimethylammonio) ethane-1-sulfonate, 3-((3-acrylamidopropyl) dimethylammonio) propane-1-sulfonate, 4-((3-acrylamidopropyl) dimethylammonio) butane-1-sulfonate, [3-(acryloyloxy) propyl](dimethylammonio) acetate, dimethylamino propyl methylacrylamide derivatives such as 2-((3-methacrylamidopropyl) dimethylammonio) ethane-1-sulfonate, 3-((3-methacrylamidopropyl) dimethylammonio) propane-1-sulfonate, 4-((3-methacrylamidopropyl) dimethylammonio) butane-1-sulfonate and [3-(methacryloyloxy) propyl](dimethylammonio) acetate and mixtures thereof.

Optionally, the synthetic polymer P comprises at least one hydrophobic monomer chosen in the list: groups consisting of (meth)acrylic acid esters with a C4-C30 alkyl, arylalkyl (C4-C30 alkyl, C4-C30 aryl), propoxylated, ethoxylated or ethoxylated and propoxylated chain; (meth)acrylamide derivatives with a propoxylated, ethoxylated, ethoxylated and propoxylated C1-C3 alkyl, arylalkyl (C4-C30 alkyl, C4-C30 aryl) or dialkyl (C4-C30 alkyl) chain; alkyl aryl sulfonates (C4-C30 alkyl, C4-C30 aryl), or by mono- or di-substituted (meth)acrylamide amides having a C4-C30 alkyl, arylalkyl (C4-C30 alkyl, C4-C30 aryl), propoxylated, ethoxylated, or ethoxylated and propoxylated chain; (meth) acrylamide derivatives with a C4-C30 alkyl, propoxylated arylalkyl (C4-C30 alkyl, C4-C30 aryl), ethoxylated, ethoxylated and propoxylated, or C4-C30 dialkyl chain; alkyl aryl sulfonates (C4-C30 alkyl, C4-C30 aryl) and mixtures thereof.

Water-soluble polymer P advantageously comprises less than 1 mol % of at least one hydrophobic monomer. It may be devoid of hydrophobic monomers. When the water-soluble polymer P according to the invention comprises one or more hydrophobic monomers, they are present in an amount such that the polymer P remains soluble in water.

In a particular embodiment, the polymer P results from the condensation between an epihalohydrin and a dialkylamine, preferably epichlorohydrin and dimethylamine.

According to the invention, the polymer P is advantageously linear or structured. By structured polymer refers to a non-linear polymer which has side chains to obtain, when this polymer is dissolved in water, a strong state of entanglement leading to very high low-gradient viscosities.

The polymer P according to the invention can further be structured by:

- at least one structuring agent, which may be selected from the group comprising polyethylenically unsaturated monomers (having at least two unsaturated functions), such as vinyl functions, in particular allyl functions, acrylic and epoxy functions, such as methylene bis acrylamide (MBA), triallylamine, or tetraallylammonium chloride or 1,2 dihydroxyethylene bis-(N-acrylamide), and/or
- at least one macroinitiator such as polyperoxides, polyazoids and polyagents such as transfer agents such as polymer-capturing (co)polymers and polyols, and/or
- at least one functionalized polysaccharide.

Said structuring agent, macroinitiator and functionalized polysaccharide are called "branching/crosslinking agent".

The amount of branching/crosslinking agent in the monomer mixture is advantageously less than 4% by weight based on the monomer content (by weight), more less than 1%, and even more advantageously less than 0.5%. According to a particular embodiment, it can be superior or equal to 0.00001% by weight of the monomer content.

According to the invention, the polymer P can have a linear, branched, star, comb, dendritic or block structure. These structures can be obtained by selecting the initiator, transfer agent, polymerization technique, such as controlled radical polymerization known as RAFT (reversible addition fragmentation chain transfer), NMP (Nitroxide Mediated Polymerization") or the incorporation of structural monomers, the concentration.

In a particular embodiment, the polymer P according to the invention can be a semi-synthetic and therefore semi-natural polymer. In this mode, the polymer can be synthesized by total or partial graft copolymerization of at least one monomer according to the invention, and at least one natural compound, said natural compound being preferably selected from polysaccharides and their derivatives and modified versions (chemically modified) thereof. Polymerization is generally carried out, without this being limiting, by copolymerization or by grafting. The person skilled in the art may refer to general knowledge of semi-natural polymers.

The synthetic polymer P does not require the development of any polymerization process. In fact, it can be obtained using any polymerization technique well known to those skilled in the art. It can be obtained by solution polymerization, gel polymerization, precipitation polymerization, emulsion polymerization (aqueous or inverse), suspension polymerization, polymer-reactive extrusion polymerization, water-in-water polymerization, or micellar polymerization.

Polymerization is generally free-radical polymerization. By free-radical polymerization, we include free-radical polymerization using UV, azo, redox, or thermal initiators, as well as controlled radical polymerization (CRP) techniques or matrix polymerization techniques.

The synthetic polymer P according to the invention can be modified after it has been obtained by polymerization. This is referred to as post-modification of the polymer. All known post-modifications can be applied to the polymer according to the invention. Preferred modification is post-hydrolysis.

Post-hydrolysis consists of the reaction of hydrolysable functional groups of monomer units, advantageously non-ionic, more preferably amide or ester functions, with a hydrolysis agent. This hydrolysis agent may be an enzyme, an ion exchange resin, an alkali metal or a suitable acidic compound. Preferably, the hydrolysis agent is a Brønsted base. When the polymer P comprises monomeric amide and/or ester units ester monomer units, then the post-hydrolysis reaction produces carboxylate groups.

According to the invention, the polymer P may be in liquid, gel or solid form. When the polymer P is in solid form, its preparation process includes a drying step such as spray drying, drum drying, radiation drying such as microwave drying, or fluidized bed drying. Preferably the polymer P is in liquid form and more preferably the polymer P is in aqueous solution.

The polymer P has an average molecular weight in weight superior to 500 Dalton, preferably to 1000 Dalton. Preferably, the average molecular weight is between 1000 Dalton and 40 million Dalton, more preferentially between 10 000 Dalton and 20 million Dalton, and even more preferably between 100 000 Dalton and 20 million Dalton.

The molecular weight is advantageously determined by the intrinsic viscosity of the (co)polymer. The intrinsic viscosity can be measured by methods known to the known to the skilled person and can be calculated from the reduced viscosity values for different (co)polymer concentrations, by graphically plotting the reduced viscosity the reduced viscosity values (y-axis) over the concentration (x-axis) and extrapolating the curve to zero concentration. The intrinsic viscosity is plotted on the y-axis or using the least-squares method. The molecular weight can then be determined using the Mark-Houwink equation.

$$[\eta]=K M^{\alpha}$$

$[\eta]$ represents the intrinsic viscosity of the (co)polymer determined by the method of solution viscosity measurement method.

K represents an empirical constant.

M represents the molecular weight of the (co)polymer.

$\alpha$ represents the Mark-Houwink coefficient.

K and $\alpha$ depend on the particular (co)polymer-solvent system.

Between 0.01 ppm by weight and 10 000 ppm by weight of polymer P is added to the CSC, preferably between 0.1 ppm and 1 000 ppm, more preferably between 1 ppm and 100 ppm. Polymer P is added to the CSC in one portion or with several additions of different fractions.

During addition of the polymer P, CSC can be stirred. The stirring is preferably stopped at the end of the addition of the polymer P.

During the step of addition of polymer P into the CSC, the temperature of said CSC is maintained between 20° C. and 80° C., preferably between 20° C. and 60° C.

The water-soluble polymer P may be added to the CSC during transfer of the CSC from exit of the evaporator and the optional vessel V, and/or in the optional vessel V, and/or during transfer of the CSC from the evaporator to the solid/liquid separation step. In all cases, the temperature of the CSC is maintained between 20° C. and 80° C., preferably between 20° C. and 60° C. during the step of addition of polymer P.

Before, during or after the addition of the polymer P to the CSC, a seeding agent may be advantageously added in the CSC. During the step of addition of the seeding agent, the temperature of the CSC is maintained between 20 and 80° C., preferably between 20° C. and 60° C. The seeding agent allows to initiate formation of particles in the CSC and more particularly vanadium oxide VO particles. Preferably, the seeding agent is a metal salt. More preferably, the metal salt is a lead salt.

When formation of vanadium oxide VO particles in CSC is visually finished, said particles of the resulting suspension S are recovered by a liquid solid separation method. Liquid solid separation method can be filtration, centrifugation or other methods know by the skilled man of the art.

Preferably, vanadium oxide VO particles recovered from the suspension S are washed at least once by an aqueous solution. Washing step includes obtention of a suspension of said particles in an aqueous solution and a liquid solid separation.

Preferably, vanadium oxide VO particles recovered from the suspension S comprise at least 5% by weight of vanadium oxide, more preferably at least 10% by weight.

The invention and the advantages thereof will become more apparent from the following examples.

EXAMPLES

A spent liquor (SL) coming from an alumina plant (Bayer Process) is used to be realistic. Exact composition of the spent process liquor is unknown.

The experimental process is the following:

1) The spent liquor (SL) is properly collected at the exit of the heat exchanger (Temperature is about 40° C.) and used quickly after sampling to limit the cooling of the solution.
2) The polymer to be tested is prepared as an aqueous solution comprising 5 g/L of solid polymer. A certain volume of this solution (depending on the concentration of polymer to be tested) is added to 1 L of SL under agitation. For the blank, no polymer is added.
3) The SL, containing or not the polymer, is then introduced into a 1 liter separating funnel (used to mimic in laboratory the large conical shape tanks industrial) and hold for 2 hours at room temperature.
4) After 2 hours, two different phases are observed in the separating funnel. The bottom phase is collected and filtered using a Büchner filtration system.
5) The percentage of vanadium included in the bottom phase is then determined.

To make a proper polymer selection, various polymers of various chemistries provided by SNF SA have been tested at a concentration of 3 ppm (meaning 0.6 mL of the 5 g/L of the aqueous polymer solution) (Table 1):

TABLE 1

Polymers and Vanadium Oxide extraction

| Polymer | Polymer composition | Average molecular Weight (kDa) | Mass Recovered (g) | Vanadium Oxide (%) |
|---|---|---|---|---|
| Blank | — | — | 4.4804 | 18.0 |
| Polymer 1 | Dextran | 5 000 | 5.5215 | 22.2 |
| Polymer 2 | 80 mol % ACM[1]/20 mol % AA.Na[2] Copolymer | 15 000 | 5.9077 | 21.6 |
| Polymer 3 | ACM[1] Homopolymer | 10 000 | 4.9074 | 20.9 |
| Polymer 4 | 80 mol % ACM[1]/20 mol % DMAEA-Quat[3] Copolymer | 10 000 | 4.9586 | 21.0 |
| Polymer 5 | 80 mol % ACM[1]/20 mol % ATBS[4] Copolymer | 8 000 | 5.0973 | 21.2 |
| Polymer 6 | DADMAC[5] Homopolymer | 150 | 4.7894 | 19.5 |

[1]ACM = Acrylamide
[2]AA. Na = Sodium Acrylate
[3]DMAEA-Quat = Dimethylaminoethyl acrylate quaternized with methyl chloride
[4]ATBS = 2-Acrylamideo-2-Methylpropane Sulfonic Acid
[5]DADMAC = Diallyl Dimethyl Ammonium Chloride Whatever, the chemistry of the polymer used an increase of vanadium oxide recovery is obtained. The chemistry based on polysaccharides such as Dextran performs greater. Thus, further tests have been carried out using Polymer 1.

Dosage Selection of Polymer 1:

Test have been carried out at different concentration of Polymer 1 (Dextran) to get an optimum efficiency concentration (Table 2).

TABLE 2

Polymer dosage and Vanadium Oxide extraction

| Dosage (ppm) | Mass Recovered (g) | Vanadium Oxide (%) |
|---|---|---|
| 0 | 4.4804 | 18.0 |
| 0.5 | 5.1292 | 21.7 |
| 1 | 5.1545 | 21.9 |
| 1.5 | 5.2197 | 22.3 |
| 3 | 5.5215 | 22.2 |
| 4.5 | 7.1429 | 22.7 |

Vanadium Oxide recovery is increasing with the increase of dextran concentration. Furthermore, during the test it appeared that the used of Dextran make it possible to increase the kinetics of VO particles precipitation. Indeed, it was observed within the SL containing Dextran more crystals formation and with a bigger size compared to the blank.

The invention claimed is:

1. A process for vanadium oxides extraction from a spent liquor generated in a Bayer process comprising the following steps:

sending the spent liquor to an evaporator, to separate condensate water from caustic soda concentrate, optionally transferring the caustic soda concentrate to a vessel, cooling and maintaining the temperature of the caustic soda concentrate between 20° C. and 80° C., adding a water-soluble polymer to said caustic soda concentrate to obtain a suspension comprising vanadium oxide particles, recovering said vanadium oxide particles of the suspension by a liquid-solid separation method.

2. The process according to claim 1, wherein the water-soluble polymer is a polysaccharide.

3. The process according to claim 2, wherein the polysaccharide is a dextran.

4. The process according to claim 1, wherein the water-soluble polymer is a synthetic polymer.

5. The process according to claim 4, wherein the water-soluble polymer comprises at least one hydrophilic monomer selected from the group consisting of:

nonionic monomers selected from the group consisting of: acrylonitrile, acrylamide, methacrylamide, N-vinylformamide (NVF), N-vinylacetamide, N-vinylpyrrolidone (NVP), N-vinylimidazole, N-vinyl succinimide, acryloyl morpholine (ACMO), glycidyl methacrylate, glyceryl methacrylate, diacetone acrylamide, hydroxyalkyl ($C_1$-$C_3$)-(meth)acrylate, thioalkyl ($C_1$-$C_3$)-(meth)acrylate, and mixtures thereof;

anionic monomers selected from the group consisting of: acrylic acid, methacrylic acid, itaconic acid, crotonic acid, maleic acid, fumaric acid, acrylamido undecanoic acid, 3-acrylamido 3-methylbutanoic acid, maleic anhydride, 2-acrylamido-2-methylpropane sulfonic acid (ATBS), vinylsulfonic acid, vinylphosphonic acid, methallylphophonic acid, 2-sulfoethylmethacrylate, sulfopropylmethacrylate, sulfopropylacrylate, allylphosphonic acid, styrene sulfonic acid, 2-acrylamido-2-methylpropane disulfonic acid, salts thereof, and mixtures thereof; and cationic monomers selected from the group consisting of: diallyldialkyl ammonium salts; acidified or quaternized salts of dialkylaminoalkylacrylamides; acidified or quaternized salts of dialkyl-aminoalkylmethacrylamides, acidified or quaternized salts of dialkylaminoalkyl acrylate, acidified or quaternized salts of dialkylaminoalkyl methacrylate, and mixtures thereof, wherein alkyl is $C_1$-$C_3$.

6. The process according to claim 1, wherein a seeding agent is added in the caustic soda concentrate before, during or after the step of adding of water-soluble polymer, said caustic soda concentrate being maintained between 20° C. and 80° C. during the addition of the seeding agent.

7. The process according to claim 6, wherein seeding agent is a metal salt.

8. The process according to claim 1, wherein 0.01 ppm by weight to 10,000 ppm by weight of water-soluble polymer is added to the caustic soda concentrate.

9. The process according to claim 1, wherein vanadium oxide particles recovered from the suspension are washed at least once by an aqueous solution.

10. The process according to claim 1, wherein the caustic soda concentrate is transferred to the vessel, and the step cooling of the caustic soda concentrate is performed during transfer of the caustic soda concentrate from an exit of the evaporator to the vessel.

* * * * *